(12) United States Patent
Usui et al.

(10) Patent No.: US 8,371,948 B2
(45) Date of Patent: Feb. 12, 2013

(54) FLYWHEEL DEVICE

(75) Inventors: Ichiro Usui, Hamamatsu (JP); Hiroyuki Saito, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 15 days.

(21) Appl. No.: 13/044,291

(22) Filed: Mar. 9, 2011

(65) Prior Publication Data

US 2011/0244967 A1    Oct. 6, 2011

(30) Foreign Application Priority Data

Mar. 30, 2010   (JP) ................. 2010-078024

(51) Int. Cl.
*F16F 15/12*    (2006.01)
*F16F 15/167*   (2006.01)

(52) U.S. Cl. .................... 464/68.1; 74/572.21

(58) Field of Classification Search .......... 464/68.1, 464/68.2, 68.3, 68.4, 68.41, 68.5, 68.6, 68.7, 464/68.8, 68.9, 68.91, 68.92; 192/207, 208, 192/214; 74/572.2, 572.21, 574.3, 574.4

See application file for complete search history.

(56) References Cited

U.S. PATENT DOCUMENTS

| | | | |
|---|---|---|---|
| 3,296,887 A * | 1/1967 | Larsen | 464/68.41 |
| 2002/0019262 A1 * | 2/2002 | Suzuki et al. | |
| 2002/0092715 A1 * | 7/2002 | Yabe et al. | |

FOREIGN PATENT DOCUMENTS

| | | |
|---|---|---|
| JP | 2002-340092 | 11/2002 |
| JP | 2005-054907 | 3/2005 |
| JP | 2005-188661 A | 7/2005 |
| JP | 2006-010024 | 1/2006 |

OTHER PUBLICATIONS

Shigley, Mischke, Budynas, Mechancial Engineering Design, 2003, McGraw Hill, Seventh Edition, p. 396. TJ230. S5. 2004.*

* cited by examiner

*Primary Examiner* — Gregory Binda
*Assistant Examiner* — Matthieu Setliff
(74) *Attorney, Agent, or Firm* — Arent Fox LLP (57) ABSTRACT

A flywheel device includes a mass-side rotor including a mass ring and a pair of holder plates connected to both sides of the mass ring. The mass-side rotor is connected to a crankshaft with a drive plate therebetween. Between the mass-side rotor and the drive plate, a positioning apparatus for positioning those coaxially with each other is provided. The positioning apparatus includes: an annular positioning protrusion which is press formed in at least one of the pair of holder plates to project laterally outward therefrom, and which is disposed coaxially with the mass-side rotor; and a positioning recessed portion which is press formed in the drive plate coaxially with the crankshaft, and which is fitted to the positioning protrusion. Accordingly, it is possible to enable coaxial positioning of the mass-side rotor and the drive plate without performing burdensome machining on the mass ring for forming a positioning apparatus.

10 Claims, 7 Drawing Sheets

FLYWHEEL DEVICE

BACKGROUND OF THE INVENTION

1. Field of the Invention

The present invention relates to an improvement of a flywheel device, in which a flywheel assembly includes: a mass-side rotor including a mass ring and a pair of holder plates having outer peripheral portions connected to the mass ring with the mass ring sandwiched therebetween; a driven plate which includes an output hub disposed coaxially with the mass ring and which is disposed between the holder plates rotatably relative to the holder plates; and a torque damper interposed between the holder plates and the driven plate, the mass-side rotor is connected to a crankshaft with a drive plate therebetween, and positioning means for positioning the mass-side rotor and the drive plate coaxially with each other is provided between the mass-side rotor and the drive plate.

2. Description of the Related Art

Such a flywheel device is already known, for example, as disclosed in Japanese Patent Application Laid-open No. 2005-188661.

In such a conventional flywheel device, an annular positioning protrusion and an annular positioning recessed portion to be fitted to each other are formed on surfaces facing to each other of the drive plate and the mass ring as positioning means for positioning the mass-side rotor and the drive plate coaxially with each other. However, since the mass ring is generally forged or cast, the formation of the positioning protrusion or the positioning recessed portion therein requires a complicated forming die or cutting after the forging or casting, each of which is a factor inhibiting the reduction in production costs. Moreover, when the mass of the mass ring is increased along with the change in specification of the flywheel device, holder plates and the like to be connected thereto need to be manufactured newly. As a result, the mass productivities of components are reduced, which is also disadvantageous in terms of costs.

SUMMARY OF THE INVENTION

The present invention has been made in view of such circumstances, and an object of the present invention is to provide a structurally simple and inexpensive flywheel device which enables coaxial positioning of a mass-side rotor and a drive plate with respect to each other without performing burdensome machining on a mass ring for forming a positioning apparatus, and which facilitates increasing the mass of the mass ring along with change in specifications.

In order to achieve the object, according to a first feature of the present invention, there is provided a flywheel device, in which a flywheel assembly includes: a mass-side rotor including a mass ring and a pair of holder plates having outer peripheral portions connected to the mass ring with the mass ring sandwiched therebetween; a driven plate which includes an output hub disposed coaxially with the mass ring and which is disposed between the holder plates rotatably relative to the holder plates; and a torque damper interposed between the holder plates and the driven plate, the mass-side rotor is connected to a crankshaft with a drive plate therebetween, and a positioning apparatus for positioning the mass-side rotor and the drive plate coaxially with each other is provided between the mass-side rotor and the drive plate, wherein the positioning apparatus includes: an annular positioning protrusion which is press formed on at least one of the pair of holder plates to project laterally outward therefrom, and which is disposed coaxially with the mass-side rotor; and a positioning recessed portion which is press formed on the drive plate coaxially with the crankshaft, and which is fitted to the positioning protrusion.

According to the first feature of the present invention, the annular positioning protrusion and the positioning recessed portion, which are fitted to each other and constitute the positioning apparatus, are press formed respectively in the holder plate and the drive plate facing each other. Accordingly, the mass ring held between the holder plates can have flat- and simple-shaped side surfaces. In addition, it is not necessary to perform burdensome cutting on, of course, the mass ring, nor the holder plates, which enables reduction in production costs.

According to a second feature of the present invention, in addition to the first feature, the positioning protrusion is formed in each of the pair of holder plates, and an inner peripheral end of the mass ring faces annular recessed portions corresponding to the positioning protrusions and being formed on inner side surfaces of the holder plates while the driven plate is disposed inward of the annular recessed portions in a radial direction, whereby a mass of the mass ring is allowed to be increased on an inner peripheral side.

According to the second feature of the present invention, the positioning protrusion is formed in each of the pair of holder plates. Accordingly, any one of the holder plates can be positioned relative to and connected to the drive plate, so that the concern about misassembly can be eliminated. Moreover, the inner peripheral end of the mass ring faces the annular recessed portions which correspond to the positioning protrusions and which are formed on the inner side surfaces of the holder plates, and the driven plate is disposed inward of the annular recessed portions in the radial direction, thereby allowing the mass of the mass ring to be increased on the inner peripheral side. Accordingly, when the mass of the mass ring needs to be increased along with change in specification of the flywheel device, it is only necessary to replace the mass ring with one having a smaller inner diameter, so that the need for change in shape or structure of the holder plates is eliminated. This allows change in specification of the flywheel device at low costs.

According to a third feature of the present invention, in addition to the first or second feature, each of the holder plates is formed in such a manner that a half portion and the other half portion sectioned by a diameter line thereof are symmetrical to each other about the diameter line, so that the pair of holder plates are interchangeable with each other.

According to the third feature of the present invention, the holder plates can be constituted by disposing two holder plates of the same shape with each positioning protrusion facing outward. Accordingly, the mass productivity of the holder plates is improved, which can contribute to cost reduction.

According to a fourth feature of the present invention, in addition to any one of the first to third features, the mass ring and the pair of holder plates are connected to each other with a plurality of rivets arranged on a same circumference, the mass ring and the drive plate are connected to each other by screwing into the mass ring a plurality of bolts arranged on the circumference, and the drive plate is provided with relief holes for receiving enlarged end portions of the rivets. Here, the bolt corresponds to a second bolt 22 of an embodiment of the present invention, which will be described later.

According to the forth feature of the present invention, the multiple rivets and bolts are arranged on the same circumference. Accordingly, rivet holes and screw holes for the rivets and bolts can be easily formed in the holder plates and the mass ring on the same circumference, which leads to a good processability. Moreover, the relief holes for receiving the enlarged end portions of the rivets are provided in the drive plate. Accordingly, the drive plate can come into close contact with the holder plate, without being interfered with the rivets.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below based on the attached drawings.

In FIGS. 1 to 3 and 7, power from a crankshaft 1 of an engine is transmitted through a flywheel device F of the present invention to an output shaft 2 continuing to a clutch or a transmission. The flywheel device F includes a flywheel assembly 3 and a drive plate 4 connecting the flywheel assembly 3 to the crankshaft 1.

The flywheel assembly 3 includes a mass ring 5, a pair of holder plates 6, 6, a driven plate 7, and a torque damper 8. The holder plates 6, 6 have their outer peripheral portions connected to the mass ring 5 with the mass ring 5 sandwiched therebetween. The driven plate 7 includes an output hub 7a disposed coaxially with the mass ring 5 and is disposed between the holder plates 6, 6 rotatably relative to holder plates 6, 6. The torque damper 8 is interposed between the holder plates 6, 6 and the driven plate 7. In addition, the mass ring 5 and both the holder plates 6, 6 constitute a mass-side rotor 10.

The mass ring 5 is formed by forging, pressing, sintering, or casting. Both side surfaces of the mass ring 5 are flat and parallel to each other. On an outer periphery of the mass ring 5, a ring gear 12 driven by a starter of the engine is integrally formed. The integration of the mass ring 5 and the ring gear 12 in this manner allows the reduction in number of parts, which can contributes to cost reduction. For forming the mass ring 5 and the ring gear 12 integrally, forging or pressing may be employed.

In the mass ring 5, multiple inner rivet holes 13a and screw holes 14 opening to the both side surfaces of the mass ring 5 are provided in such a manner as to be arranged alternately on a same circumference 15. Meanwhile, both the holder plates 6, 6 are formed by pressing steel plates. The holder plates 6, 6 are provided with multiple outer rivet holes 13b and multiple inner bolt insertion holes 16a. When the holder plates 6, 6 are superposed on the mass ring 5 coaxially therewith, the outer rivet holes 13b match the respective inner rivet holes 13a, and the inner bolt insertion holes 16a match the respective screw holes 14. Accordingly, the mass-side rotor 10 in which the holder plates 6, 6 and the mass ring 5 are connected integrally and coaxially with each other can be formed in the following manner. Specifically, the holder plates 6, 6 are superposed respectively on the opposite side surfaces of the mass ring 5, the inner rivet holes 13a and the outer rivet holes 13b are matched to each other, rivets 17 are inserted therethrough, and tip portions of the rivets 17 are crimped to form the mass-side rotor 10. A moment of inertia corresponding to characteristics of the crankshaft 1 on which the mass-side rotor 10 is mounted is applied to the mass-side rotor 10.

Meanwhile, a center portion of the drive plate 4 is fastened to a shaft end of the crankshaft 1 with multiple first bolts 20. Multiple outer bolt insertion holes 16b are provided in an outer peripheral portion of the drive plate 4. When the drive plate 4 is superposed on one of the holder plates 6 while being positioned by using the positioning apparatus 21 to be described later, the outer bolt insertion holes 16b match the respective inner bolt insertion holes 16a. By screwing and securing second bolts 22 inserted through the outer bolt insertion holes 16b and the inner bolt insertion holes 16a into the screw holes 14, the drive plate 4 can be fastened to the mass ring 5 while the one of the holder plates 6, 6 is held therebetween. At this time, the tip portions of the second bolts 22 protruding from an outer surface of the mass ring 5 are received by the inner bolt insertion holes 16a of the other one of the holder plates 6, 6 located on a side opposite from the side on which the one of the holder plates 6, 6 is held. In addition, the drive plate 4 is provided with multiple relief holes 23 which receive enlarged end portions 17a of the rivets 17, respectively. Accordingly, the drive plate 4 can come into close contact with the holder plate 6 adjacent to the drive plate 4 without being interfered by the rivets 17.

Accordingly, the multiple rivets 17 and the second bolts 22 are arranged alternately on the same circumference 15. With such an arrangement, it is easy to form, on the same circumference 15, the inner rivet holes 13a and the screw holes 14 in the mass ring 5, the outer rivets 13b and the inner bolt insertion holes 16a in the holder plates 6, 6, and the outer bolt insertion holes 16b in the drive plate 4. This leads to a good processability. Meanwhile, one of the holder plates 6 on the drive plate 4 side is connected to the mass ring 5 not only with the rivets 17, but also with the second bolts 22 for fastening the drive plate 4. This reinforces the connection between the mass ring 5 and the above-described one of the holder plates 6, 6.

The positioning apparatus 21 is provided in the mass-side rotor 10 and the drive plate 4, so that the mass-side rotor 10 and the drive plate 4 can be positioned coaxially with each other. The positioning apparatus 21 will be described below.

An annular positioning protrusion 25 is press formed in each of the holder plates 6, 6 so as to protrude laterally outward from the holder plate 6, and to be positioned inward of the mass ring 5 in a radial direction. The annular positioning protrusion 25 is arranged coaxially with the mass ring 5. Meanwhile, an annular positioning recessed portion 26 is formed in the drive plate 4, which fits to any one of the positioning protrusions 25 of the holder plates 6, 6, so that the mass-side rotor 10 and the drive plate 4 can be positioned coaxially with each other. The positioning apparatus 21 is thus constituted.

The annular positioning protrusions 25 and the annular positioning recessed portion 26, which constitute the positioning apparatus 21 by being fitted to each other, are press formed respectively in the holder plates 6, 6 and the drive plate 4 facing each other. For this reason, the mass ring 5 held between the holder plates 6, 6 can have flat- and simple-shaped side surfaces. In addition, it is not necessary to perform burdensome cutting on, of course, the mass ring 5, nor the both holder plates, which enables reduction in production costs.

Furthermore, since the positioning protrusions 25 are formed in the pair of holder plates 6, 6, respectively, any one of the holder plates 6, 6 can be positioned relative to the drive plate 4 and connected thereto. This eliminates the concern about misassembly.

Figure 2:
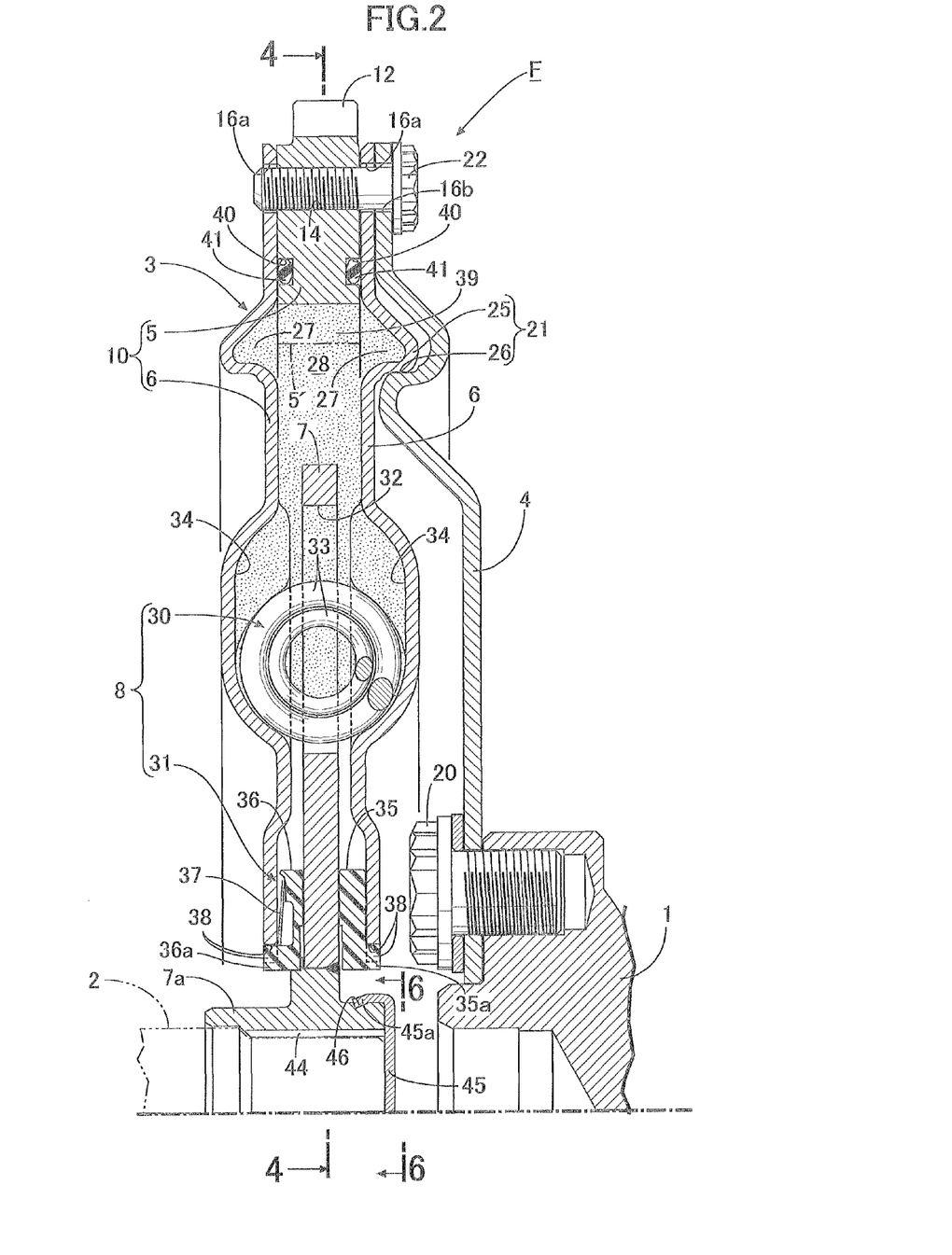
FIG. 2 is an enlarged sectional view taken along a line 2-2 in FIG. 1.
Figure 3:
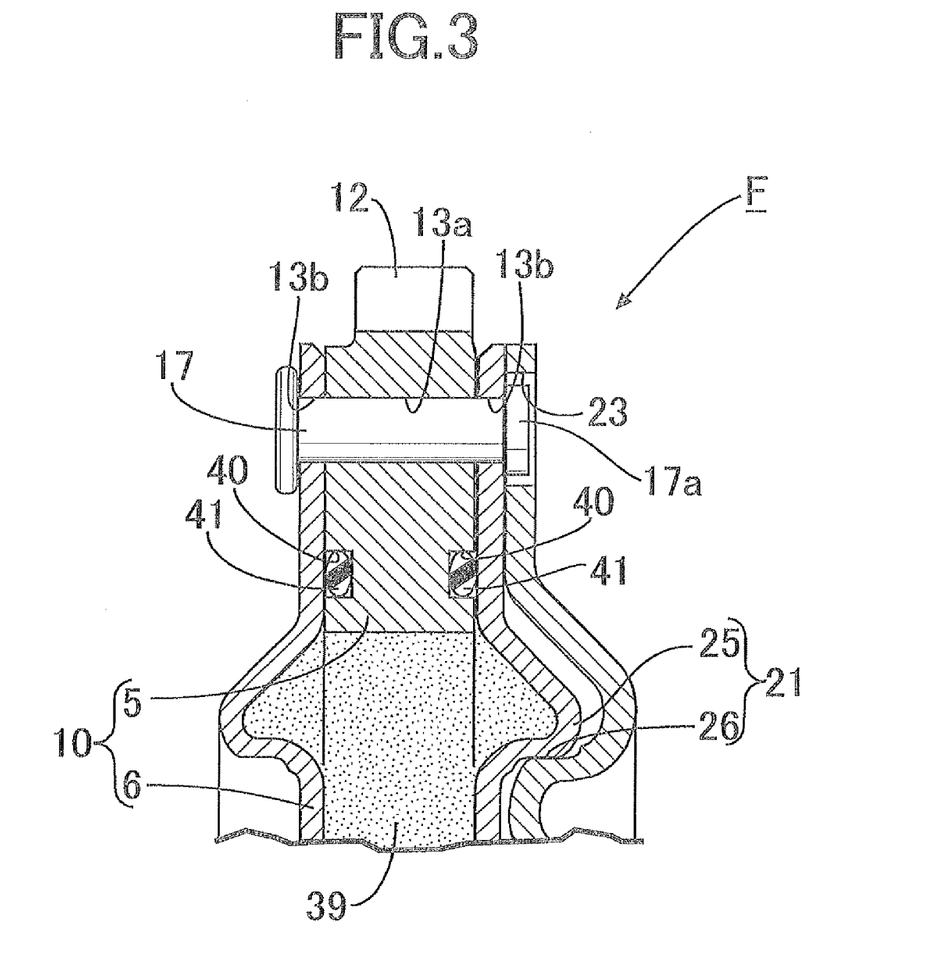
FIG. 3 is an enlarged sectional view taken along a line 3-3 in FIG. 1.

As shown in FIG. 2, an annular recessed portion 27 corresponding to the positioning protrusion 25 is naturally formed in an inner side surface of each of the holder plates 6, 6. In addition, an inner peripheral end of the mass ring 5 faces a space 28 between the annular recessed portions 27. Moreover, the driven plate 7 is disposed inward of these annular recessed portions 27 in the radial direction, so that the mass of the mass ring 5 can be increased on the space 28 side. Accordingly, when the mass of the mass ring 5 needs to be increased in accordance with the change in specification of the flywheel device F, it is only necessary to replace the mass ring 5 with one extended on an inner peripheral edge side as indicated by the reference numeral 5' in FIG. 2. Hence changing the shapes and the structures of the holder plates 6, 6 is not required. This allows change in specification of the flywheel device F at low costs.

Figure 4:
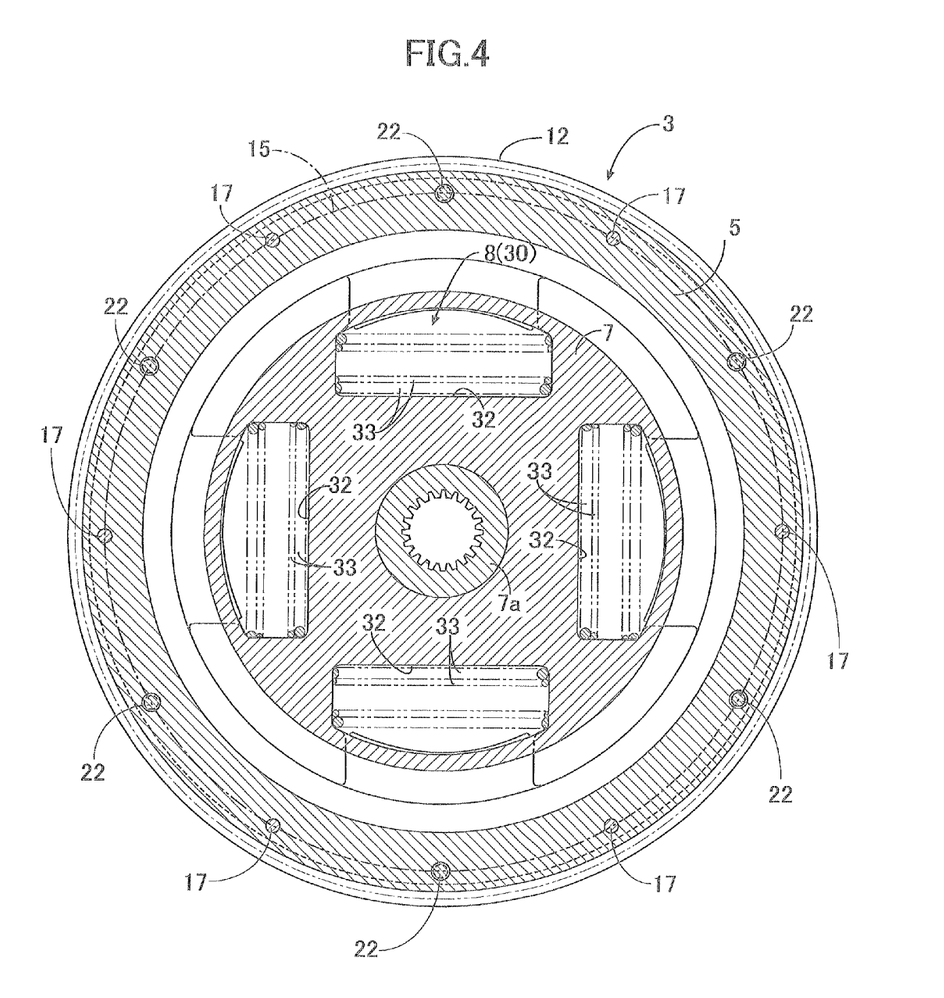
FIG. 4 is a sectional view taken along a line 4-4 in FIG. 2.
Figure 5:
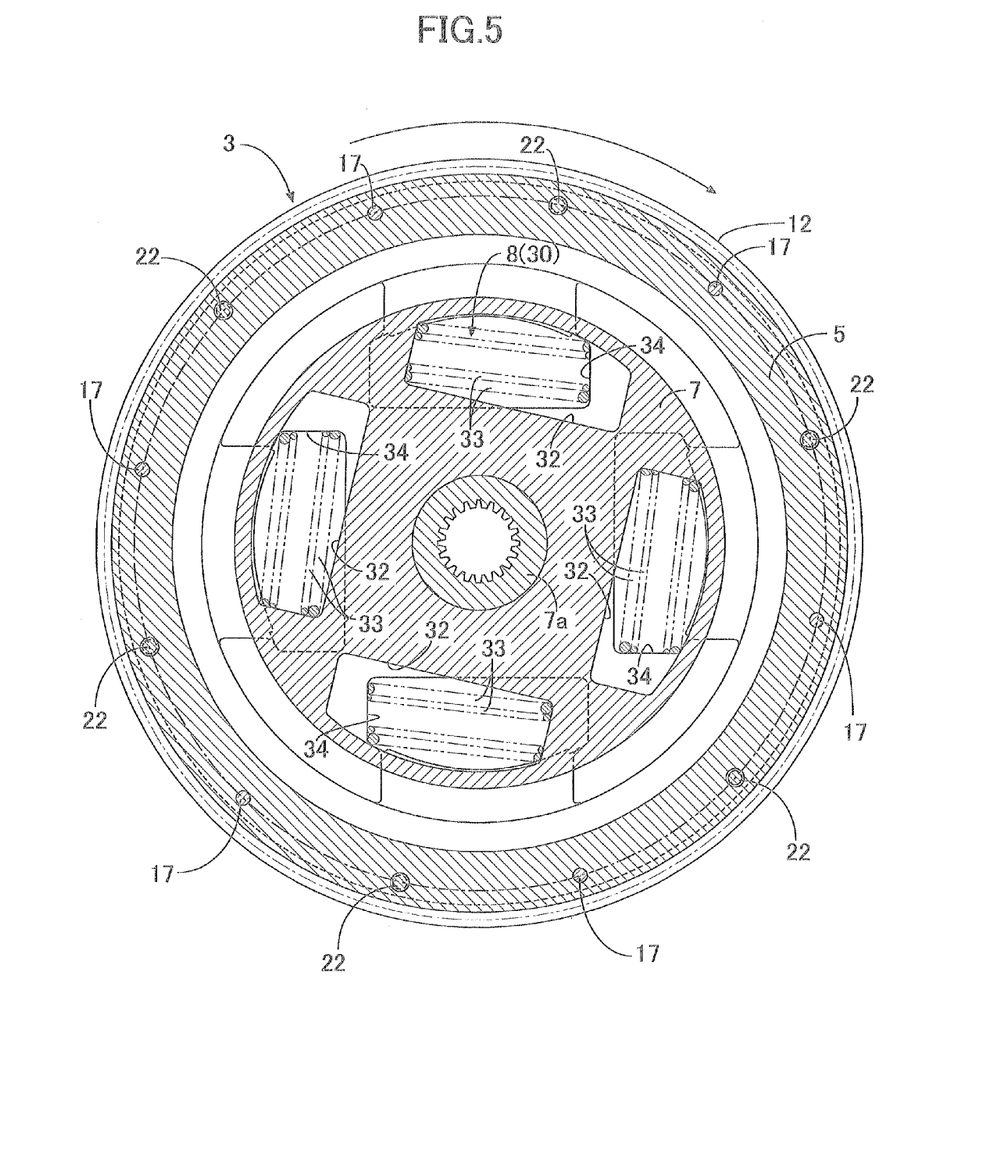
FIG. 5 is a view corresponding to FIG. 4 and explaining an operation.

Next, with reference to FIGS. 2, 4, and 5, the torque damper 8 will be described.

The torque damper 8 includes a spring damper 30 and a friction damper 31. The spring damper 30 includes multiple spring-holding holes 32, multiple coil springs 33, and multiple spring-accommodating recessed portions 34. The spring-holding holes 32 are provided to the driven plate 7 and arranged in a peripheral direction thereof. The coil springs 33 are held by the spring-holding holes 32, respectively, and arranged in the peripheral direction of the driven plate 7. The spring-accommodating recessed portions 34 are formed in each of the holder plates 6, 6 so as to accommodate and hold both side portions of the coil springs 33 protruding from the spring-holding holes 32. When the torque of the crankshaft 1 fluctuates, the torque fluctuation can be reduced by compressive deformation of the coil springs 33 occurring along with relative rotation between the holder plates 6, 6 and the driven plate 7, i.e., relative rotation between the spring-accommodating recessed portions 34 and the spring-holding holes 32 (see FIG. 5). In the example shown in the drawings, double springs are used as the coil springs 33, but single springs may also be used, instead.

The friction damper 31 includes a first friction plate 35 made of a synthetic resin, a second friction plate 36 made of a synthetic resin, and a disk spring 37. The first friction plate 35 is interposed between one of the holder plates 6, 6 and the driven plate 7 and located outward of the output hub 7a in the radial direction. The second friction plate 36 is interposed between the other one of the holder plates 6, 6 and the driven plate 7. The disk spring 37 is provided between the other one of the holder plates 6, 6 and the second friction plate 36 in a compressed state. The first and second friction plates 35, 36 have bosses 35a, 36a on inner peripheral sides thereof, respectively. The bosses 35a, 36a are fitted to corresponding inner peripheral end portions of the holder plates 6, 6 through a spline 38 so that the first and second friction plates 35, 36 and the holder plates 6, 6 can rotate integrally. Both of the friction plates 35, 36 are configured to be brought into pressure contact with the opposite side surfaces of the driven plate 7 by the set load of the disk spring 37. Accordingly, when the holder plates 6, 6 and the driven plate 7 rotate relative to each other, a friction is generated between the friction plates 35, 36 and the driven plate 7. This friction can damp the vibration of the coil springs 33. Such co-operation of the spring damper 30 and the friction damper 31 makes it possible to effectively reduce the torque fluctuation of the crankshaft 1.

The space between the holder plates 6, 6 is filled with lubricating grease 39. To prevent the leakage of the grease 39 due to centrifugal force, annular seal grooves 40 are formed in the opposite side surfaces of the mass ring 5, and O rings 41 which come in close contact with the inner side surfaces of the respective holder plates 6, 6 are inserted in the seal grooves 40.

Figure 1:
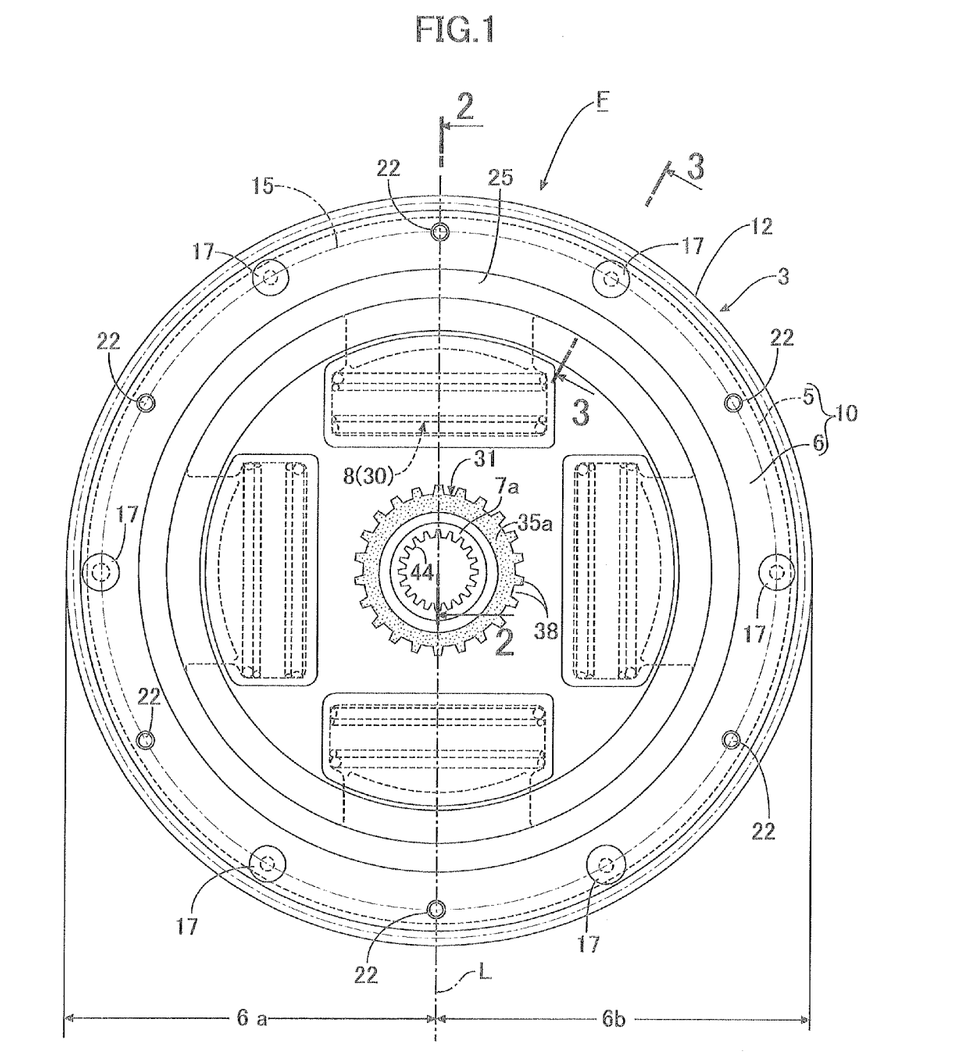
FIG. 1 is a front view of a flywheel device according to an embodiment of the present invention.

As shown in FIG. 1, each holder plate 6 including the positioning protrusion 25, the spring-accommodating recessed portion 34, the outer rivet holes 13b, and the inner bolt insertion holes 16a as described above is formed so that a half portion 6a and the other half portion 6b sectioned by a diameter line L of the holder plate 6 can be symmetric about the diameter line L. As a result, the pair of holder plates 6, 6 can be interchangeable. Accordingly, the pair of holder plates 6, 6 can be constructed by arranging two holder plates 6, 6 of the same shape with each positioning protrusion 25 facing outward. Accordingly, the mass productivity of the holder plates 6, 6 is improved, which can contribute to cost reduction.

Figure 6:
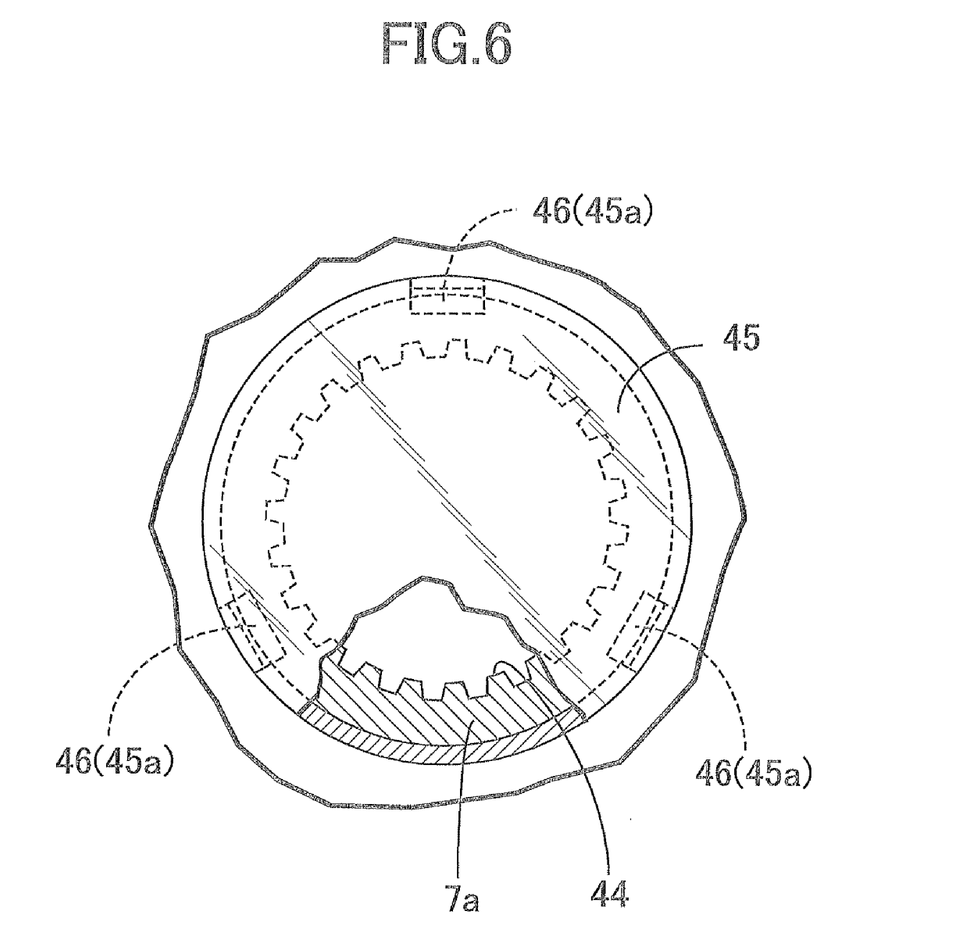
FIG. 6 is a view taken along the arrow direction of a line 6-6 in FIG. 2.

As shown in FIGS. 2 and 6, the output hub 7a of the driven plate 7 has spline holes 44 to which the output shaft 2 is spline fitted. To the spline holes 44, grease for lubrication and vibration suppression is applied. To prevent the leakage of the grease, a cap 45 is fitted to an outer peripheral surface of an end portion of the output hub 7a on a side opposite to the side from which the output shaft 2 is inserted. On the outer peripheral surface of the end portion of the output hub 7a, locking recessed portions 46 having inversely tapered bottom surfaces are provided at multiple positions in the peripheral direction. Locking claws 45a to be fitted to those locking recessed portions 46 are formed in some portions on the cap 45 by crimping. In this way, the cap 45 retaining the grease in the spline holes 44 is fixed by being fitted to the outer peripheral surface of the end portion of the output hub 7a. Accordingly, despite the presence of the cap 45, the entire length of the output hub 7a in the axial direction can be an effective length of the spline holes 44. As a result, a sufficient spline fitting length between the output hub 7a and the output shaft 2 is obtained, so that the load capacity of the spline holes 44 can be increased.

Figure 7:
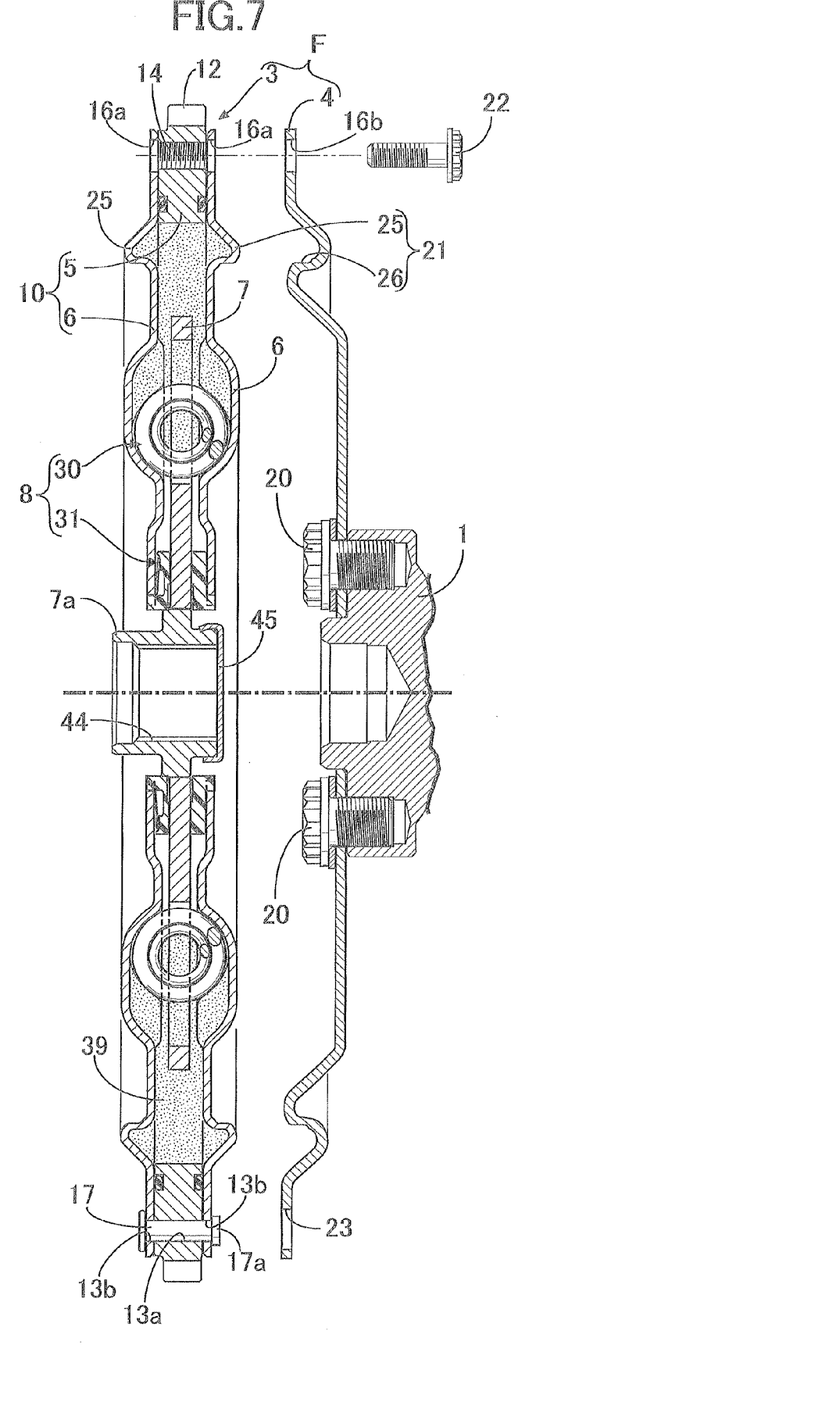
FIG. 7 is a view explaining an assembling order of the flywheel device.

As shown in FIG. 7, in assembling the flywheel device F, the flywheel assembly 3 is assembled on one hand, and the drive plate 4 is mounted on the crankshaft 1 with the first bolts 20 on the other hand. Then, the flywheel assembly 3 is connected to the drive plate 4 with the second bolts 22.

An embodiment of the present invention is not limited to the above-mentioned embodiment and may be modified in a variety of ways as long as the modifications do not depart from the gist of the present invention.

What is claimed is:
1. A flywheel device, in which
a flywheel assembly includes:
  a mass-side rotor including a mass ring and a pair of holder plates having outer peripheral portions connected to the mass ring with the mass ring sandwiched therebetween;
  a driven plate which includes an output hub disposed coaxially with the mass ring and which is disposed between the holder plates rotatably relative to the holder plates; and
  a torque damper interposed between the holder plates and the driven plate, the mass-side rotor is connected to a crankshaft with a drive plate therebetween, and
a positioning apparatus for positioning the mass-side rotor and the drive plate coaxially with each other is provided between the mass-side rotor and the drive plate, wherein the positioning apparatus includes:
identical annular positioning protrusions press formed on each of the pair of holder plates to project laterally outward therefrom, and disposed coaxially with the mass-side rotor; and
a positioning recessed portion which is press formed on the drive plate coaxially with the crankshaft, and which is fitted to one of the positioning protrusions of one of the holder plates.

2. The flywheel device according to claim 1, wherein an inner peripheral end of the mass ring faces annular recessed portions corresponding to the positioning protrusions and being formed on inner side surfaces of the holder plates while the driven plate is disposed inward of the annular recessed portions in a radial direction, whereby a mass of the mass ring is allowed to be increased on an inner peripheral side.

3. The flywheel device according to claim 2, wherein the mass ring and the pair of holder plates are connected to each other with a plurality of rivets arranged on a same circumference,
the mass ring and the drive plate are connected to each other by screwing into the mass ring a plurality of bolts arranged on the circumference, and
the drive plate is provided with relief holes for receiving enlarged end portions of the rivets.

4. The flywheel device according to claim 1, wherein the mass ring and the pair of holder plates are connected to each other with a plurality of rivets arranged on a same circumference,
the mass ring and the drive plate are connected to each other by screwing into the mass ring a plurality of bolts arranged on the circumference, and
the drive plate is provided with relief holes for receiving enlarged end portions of the rivets.

5. The flywheel device according to claim 1, wherein the holder plates are formed with recessed portions which are positioned radially inwardly of said annular positioning protrusions so as to face each other and the torque damper comprises springs which are accommodated between the recessed portions, respectively.

6. The flywheel device according to claim 1, wherein the positioning recessed portion on the drive plate is formed by press forming a part of the drive plate into a substantially S-shape in section and the drive plate is integrally formed with a radially outwardly extending portion which extends from the positioning recessed portion, and said radially outwardly extending portion is connected to the mass-side rotor and the holder plates.

7. A flywheel device, in which
a flywheel assembly includes:
a mass-side rotor including a mass ring and a pair of holder plates having outer peripheral portions connected to the mass ring with the mass ring sandwiched therebetween;
a driven plate which includes an output hub disposed coaxially with the mass ring and which is disposed between the holder plates rotatably relative to the holder plates; and
a torque damper interposed between the holder plates and the driven plate, wherein
the mass-side rotor is connected to a crankshaft with a drive plate therebetween, and
a positioning apparatus for positioning the mass-side rotor and the drive plate coaxially with each other is provided between the mass-side rotor and the drive plate, wherein the positioning apparatus includes:
an annular positioning protrusion which is press formed on at least one of the pair of holder plates to project laterally outward therefrom, and which is disposed coaxially with the mass-side rotor; and
a positioning recessed portion which is press formed on the drive plate coaxially with the crankshaft, and which is fitted to the positioning protrusion, and wherein
each of the holder plates is formed in such a manner that a half portion and the other half portion sectioned by a diameter line thereof are symmetrical to each other about the diameter line, so that the pair of holder plates are interchangeable with each other.

8. The flywheel device according to claim 7, wherein the mass ring and the pair of holder plates are connected to each other with a plurality of rivets arranged on a same circumference,
the mass ring and the drive plate are connected to each other by screwing into the mass ring a plurality of bolts arranged on the circumference, and
the drive plate is provided with relief holes for receiving enlarged end portions of the rivets.

9. A flywheel device, in which
a flywheel assembly includes:
a mass-side rotor including a mass ring and a pair of holder plates having outer peripheral portions connected to the mass ring with the mass ring sandwiched therebetween;
a driven plate which includes an output hub disposed coaxially with the mass ring and which is disposed between the holder plates rotatably relative to the holder plates; and
a torque damper interposed between the holder plates and the driven plate, wherein
the mass-side rotor is connected to a crankshaft with a drive plate therebetween, and
a positioning apparatus for positioning the mass-side rotor and the drive plate coaxially with each other is provided between the mass-side rotor and the drive plate, wherein
an inner peripheral end of the mass ring faces annular recessed portions corresponding to the positioning protrusions and being formed on inner side surfaces of the holder plates while the driven plate is disposed inward of the annular recessed portions in a radial direction, whereby a mass of the mass ring is allowed to be increased on an inner peripheral side, and wherein
the positioning apparatus includes:
an annular positioning protrusion which is press formed on at least one of the pair of holder plates to project laterally outward therefrom, and which is disposed coaxially with the mass-side rotor; and
a positioning recessed portion which is press formed on the drive plate coaxially with the crankshaft, and which is fitted to the positioning protrusion, and wherein
each of the holder plates is formed in such a manner that a half portion and the other half portion sectioned by a diameter line thereof are symmetrical to each other about the diameter line, so that the pair of holder plates are interchangeable with each other.

10. The flywheel device according to claim 9, wherein the mass ring and the pair of holder plates are connected to each other with a plurality of rivets arranged on a same circumference, the mass ring and the drive plate are connected to each other by screwing into the mass ring a plurality of bolts arranged on the circumference, and the drive plate is provided with relief holes for receiving enlarged end portions of the rivets.

* * * * *